United States Patent
Cookman et al.

(10) Patent No.: US 7,430,020 B1
(45) Date of Patent: Sep. 30, 2008

(54) SEPARATION OF COMPOSITE VIDEO SIGNALS USING DOT CRAWL DETECTOR

(75) Inventors: Jordan C. Cookman, San Jose, CA (US); Cai-Zhang Zhou, Fremont, CA (US)

(73) Assignee: ESS Technology, Inc., Fremont, CA (US)

( * ) Notice: Subject to any disclaimer, the term of this patent is extended or adjusted under 35 U.S.C. 154(b) by 607 days.

(21) Appl. No.: 11/176,480

(22) Filed: Jul. 7, 2005

(51) Int. Cl.
 *H04N 9/78* (2006.01)
(52) U.S. Cl. ............................... 348/666; 348/663
(58) Field of Classification Search .......... 348/663–670
 See application file for complete search history.

(56) References Cited

U.S. PATENT DOCUMENTS

| 4,240,105 | A |  | 12/1980 | Faroudja |
| 4,864,389 | A |  | 9/1989 | Faroudja et al. |
| 4,984,068 | A | * | 1/1991 | Sugiyama et al. ............ 348/669 |
| 5,231,478 | A | * | 7/1993 | Fairhurst .................... 348/663 |
| 5,325,186 | A | * | 6/1994 | Ishizuka et al. ............. 348/663 |
| 6,175,389 | B1 |  | 1/2001 | Felts, III et al. |
| 6,459,457 | B1 |  | 10/2002 | Renner et al. |

OTHER PUBLICATIONS

The Society of Motion Picture and Television Engineers 170M-1999 SMPTE Standard, "Composite Analog Video Signal—NTSC for Studio Applications" Apr. 21, 1999, pp. 1-19.

* cited by examiner

*Primary Examiner*—M. Lee
(74) *Attorney, Agent, or Firm*—Kenta Suzue; Haynes Beffel & Wolfeld LLP (57) ABSTRACT

The present invention relates to separation of composite video signals, such as NTSC or PAL signals. In particular, it relates to accurate decoding of chrominance and luminance components, which may reduce so-called dot crawl and false color artifacts of at least some images.

23 Claims, 10 Drawing Sheets
(2 of 10 Drawing Sheet(s) Filed in Color)

SEPARATION OF COMPOSITE VIDEO SIGNALS USING DOT CRAWL DETECTOR

RELATED APPLICATION

This application is related to U.S. patent application Ser. No. 10/725,966 entitled "Optimized Structure for Digital Separation of Composite Video Signals," by inventors Ping Dong and Jordan Cookman, filed 1 Dec. 2003. The related application is incorporated by reference.

BACKGROUND OF THE INVENTION

The present invention relates to separation of composite video signals, such as NTSC or PAL signals. In particular, it relates to accurate decoding of chrominance and luminance components, which may reduce so-called dot crawl and false color artifacts of at least some images.

According to Grassman's laws, the human eye can distinguish three kinds of differences or variations. These three components can be represented in many ways. One common way is to represent them as intensities of red (R), green (G), and blue (B) light. They can also be represented as a single luminance (Y) component, along with two chrominance (C) components. The chrominance components can be viewed as color difference signals (B-Y, R-Y), or in polar coordinates as an angle (hue) and magnitude (saturation.)

Typically, composite video signals are generated by adding a baseband luminance signal to a quadrature modulated chrominance signal. Two commonly used standards are known as "NTSC" (developed by the National Television System Committee in the USA in 1953 to be compatible with black-and-white transmissions) and "PAL" (developed in Europe in the 1960s, employing the technique of phase-alternating lines.) There are several variations of these techniques, including the use of different line and frame frequencies and different sub-carrier frequencies used for quadrature modulation. Details of such techniques are well known and can be found in the relevant national standards, or in international standards such as ITU-R BT.470. The theory about the components of visible light and the techniques used for generation of composite video signals are also well known and can also be found in textbooks on video signal processing, such as *Digital Video and HDTV Algorithms and Interfaces*, by Charles Poynton.

Figure 1:
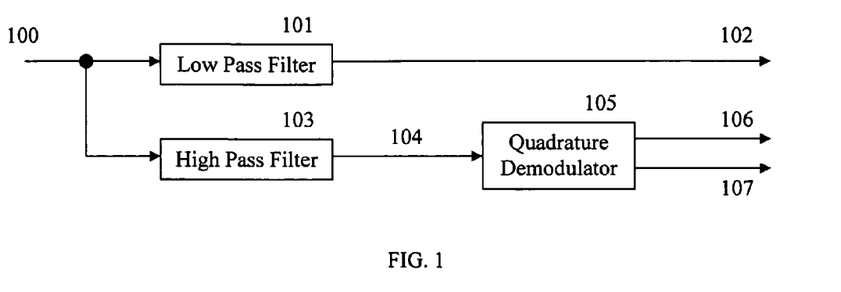
FIG. 1 is a block diagram of a conventional 1-dimensional signal separation structure.

The simplest way to separate the luminance and chrominance components of a composite video signal is to use a combination of low-pass and high-pass filters before quadrature demodulation. This technique assumes that the majority of the luminance signal is below a certain frequency, while the majority of the chrominance signal is above the same frequency. Because such filters only operate in the horizontal direction of the image, this technique is considered one-dimensional. A block diagram of a device employing this technique appears in FIG. 1. The composite signal 100 goes through a low-pass filter 101 to generate the luminance signal 102. The composite signal 100 also goes though a high-pass filter 103 to generate the modulated chrominance signal 104. The modulated chrominance signal 104 is then demodulated by a quadrature demodulator 105 to form the color difference signals 106, 107.

A disadvantage of this configuration is that, in practice, there is some overlap between luminance and chrominance signals in the frequency domain. Therefore, this structure will cause some luminance information to be decoded as chrominance, and vice versa, resulting in visible artifacts in the decoded image. The restriction of the luminance bandwidth to lower frequencies also results in a lower quality image.

Figure 13:
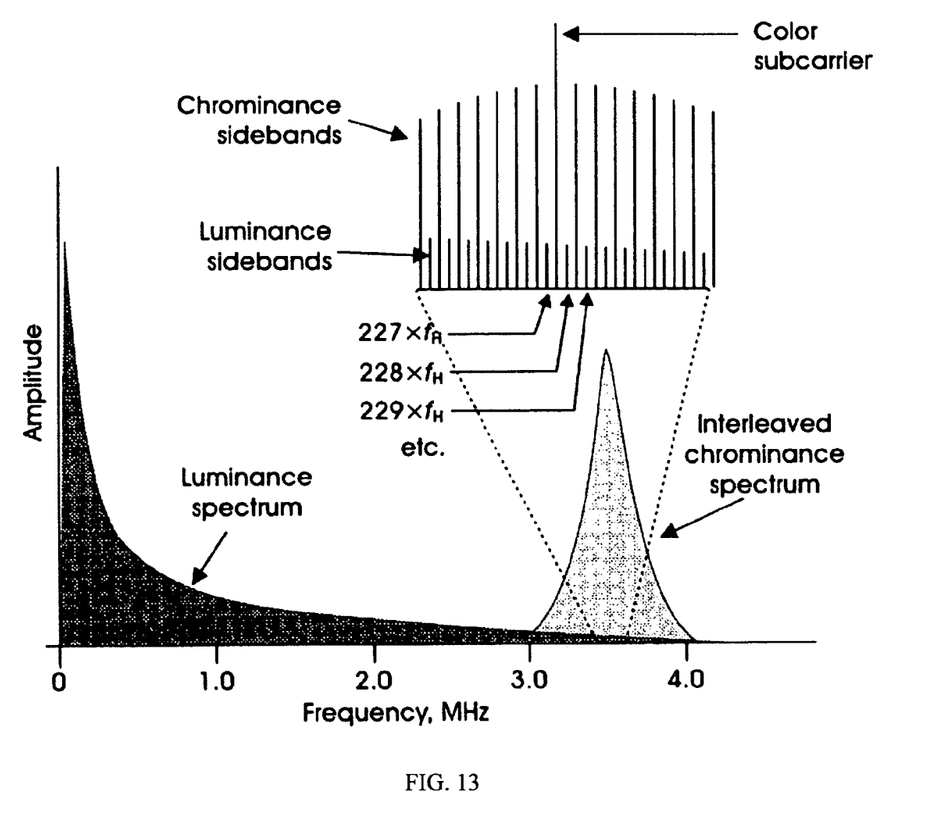
FIG. 13 illustrates the overlap between chrominance sidebands and luminance sidebands in an NTSC color coded signal.

Another way of separating luminance and chrominance recognizes that the luminance and chrominance signals typically do not change a great deal between adjacent lines, and the chrominance subcarrier is designed to have opposite phase for either adjacent lines (NTSC) or every second line (PAL.) Thus, by averaging the composite signal for two lines, the modulated chrominance signal will cancel, leaving only the luminance signal. By taking the difference of two lines, the luminance signal will be cancelled, leaving only the chrominance signal. This type of structure is known as a comb filter. To better understand the operation of the comb filter, it is useful to consider the power spectrum of the composite video signal. FIG. 13 from Multimedia—Video Signals—by Philipp Sluallek and Marco Lohse, accessed at http://graphics.cs.uni-sb.de/Courses/ss03/Multimedia/folien/Video.pdf on 16 May 2005, illustrates the overlap between chrominance sidebands and luminance sidebands in an NTSC color coded signal. A similar illustration can be found on p. 362 of the previously referenced book by Charles Poyton. One practicing this art will recognize that the chrominance information is quadrature modulated by a subcarrier whose frequency is an odd multiple of one half the video line rate. This relationship causes the luminance and chrominance power to have peaks that are interleaved in the frequency domain. A filter that averages the composite signal for two lines has a frequency response that resembles the teeth of a comb, passing the luminance peaks, and rejecting the chrominance peaks. Because this structure operates in both horizontal and vertical directions of the image, it is considered a two-dimensional technique. A block diagram of a structure employing a simple comb filter appears in FIG. 2. The composite signal 100 goes through a delay element 201, which delays the signal by one (NTSC) or two (PAL) lines. The delayed signal 202 goes to an adder 203, where it is added to the composite signal 100 to obtain the luminance component 204. The delayed signal 202 also goes to a second adder 205, where it is subtracted from the composite signal 100 to obtain the modulated chrominance component 206. Scale factors may be required before or after the adders to ensure that the component signals are in the correct range. The modulated chrominance signal 206 is then demodulated by a quadrature demodulator 207 to form the color difference signals 208, 209.

Figure 2:
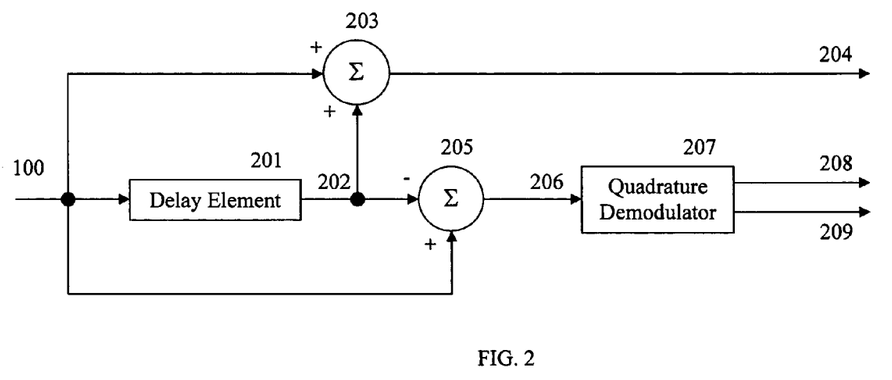
FIG. 2 is a block diagram of a conventional 2-line passband signal separation structure.

One problem with the simple comb filter structure of FIG. 2 is that the assumption that luminance and chrominance signals do not change substantially between lines is not always true. Therefore, the decoded image will have visible artifacts around horizontal (line-to-line) transitions. Another disadvantage of this structure is that it is sensitive to errors in the phase of the chrominance signal. If the phase of the chrominance subcarrier is misaligned after the delay, adding the phase shifted signals will result in imperfect cancellation of the chrominance signal.

To address the problem of horizontal transitions, more complicated signal separation devices use signal information from three or more lines, and employ a vertical processing block to detect transitions and select various combinations of the lines based on that detection. The vertical processing block may also select a horizontal filter output when an appropriate combination of lines cannot be found. An example of this type of structure can be found in UK Patent Application GB 20666 15, "Improvements to Color Television Decoding Apparatus."

Figure 3:
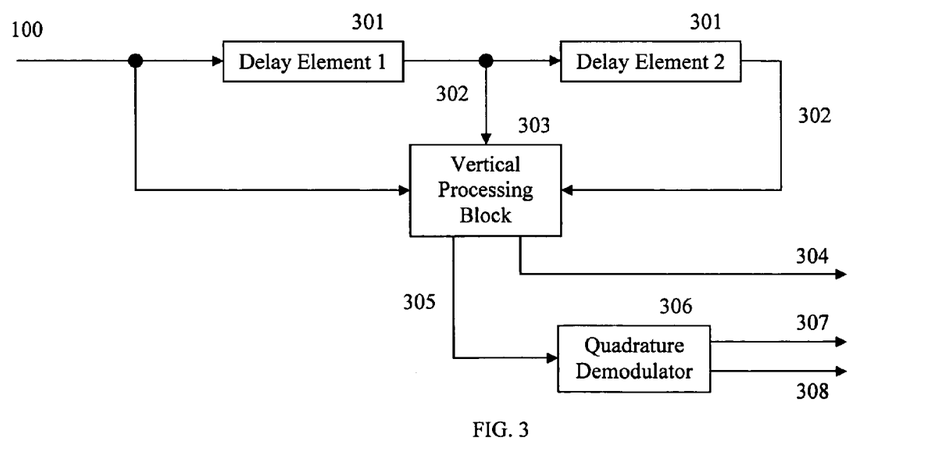
FIG. 3 is a block diagram of an enhanced conventional passband signal separation structure.

Further improvements can be realized by using signal information from multiple lines of the image. Because these structures operate in horizontal and vertical directions of the image, as well as over multiple frames, they are considered three-dimensional. Examples can be found in U.S. Pat. No. 5,473,389, "Y/C Separator Using 3-D, 2-D, and 1-D Filters," and U.S. Pat. No. 5,502,509, "Chrominance-Luminance Separation Method and Filter Performing Selective Spatial Filter Based on Detected Spatial Correlation." A generalized block diagram of the enhanced comb filter structure, which may be two-dimensional or three-dimensional depending on whether any of the delay elements store entire frames, appears in FIG. 3. For the sake of generality, the term "vertical processing" will be used herein to include two-dimensional and three-dimensional processing. The composite signal 100 goes to a cascade of delay elements 301, which delay the signal by various multiples of the line or frame period, generating multiple delayed signals 302. Although only two delay elements are shown in the figure, more could be added without departing from the general structure. The delayed signals 302 and the composite signal 100 proceed to a vertical processing block 303, which determines the best combination of signals to generate luminance 304 and modulated chrominance 305 signals. The modulated chrominance signal 305 is then demodulated by a quadrature demodulator 306 to form the color difference signals 307, 308.

Figure 4:
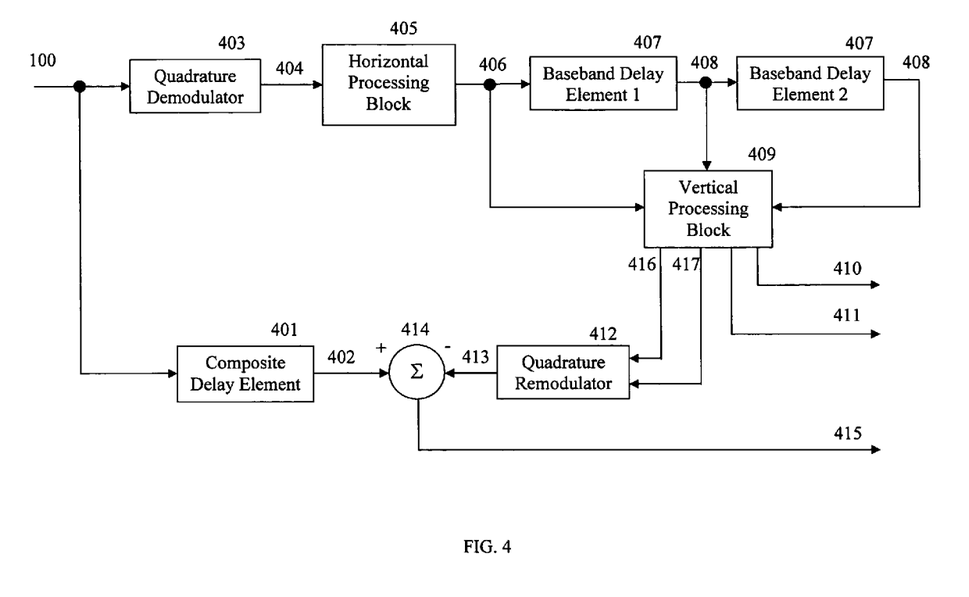
FIG. 4 is a block diagram of a conventional baseband signal separation structure.

In the configurations described above, the signal separation operations occur before quadrature demodulation of the chrominance signal. These can be called "passband" structures. To address the problem of subcarrier phase sensitivity, some signal separation devices perform demodulation before signal separation by the vertical processing block. These can be called "baseband" structures. Examples of baseband structures appear in U.S. Pat. No. 6,052,157, "System and Method for Separating Chrominance and Luminance Components of a Color Television System;" U.S. Pat. No. 6,175,389, "Comb Filtered Signal Separation;" and U.S. Pat. No. 6,459,457, "Adaptive Color Comb Filter." A generalized block diagram of the baseband comb filter structure appears in FIG. 4. The composite signal 100 goes to a composite delay element 401, which generates a delayed composite signal 402. The composite signal 100 also goes to a quadrature demodulator 403, which generates a complex baseband signal 404. The complex baseband signal 404 goes to a horizontal processing block 405, which generates a filtered complex baseband signal 406. The filtered complex baseband signal 406 goes to a cascade of complex baseband delay elements 407, which delay the complex baseband signal by various multiples of the line or frame period, generating multiple delayed complex baseband signals 408. Although only two baseband delay elements are shown in FIG. 4, more could be added without departing from the general structure. The delayed complex baseband signals 408 and the filtered complex baseband signal 406 proceed to vertical processing block 409, which determines the best combination of signals to generate first color difference signals 410, 411 and second color difference signals 416, 417. The first color difference signals 410, 411 are used for output. The second color difference signals 416, 417 proceed to a remodulator 412, which generates a modulated chrominance signal 413. The second color difference signals 416, 417 may or may not be the same as the first color difference signals 410, 411. The modulated chrominance signal 413 goes to adder 414, which subtracts the modulated chrominance signal 413 from delayed composite signal 402 to form the luminance output 415.

The main disadvantage of the baseband structure configuration is that it requires increased memory space to implement the complex baseband delay elements. Because the baseband signal is complex, it requires twice the memory as the composite signal, assuming the same precision and sampling rate requirements. This is because the composite signal is sampled as a number that has only a real part whereas the complex baseband signal has both real and imaginary parts. This requirement may be reduced by decimating or reducing the precision of the complex baseband signal. For example, see FIG. 10 of U.S. Pat. No. 6,175,389 and the relevant description. However, both decimation and precision reduction result in the loss of signal information that may be useful for later processing. Decimation of the baseband signal also requires that interpolation be done before remodulation, increasing the complexity of the implementation. A device and method to address these shortcomings was disclosed in U.S. patent application Ser. No. 10/725,955, which shares a common inventor with the present application and was assignable to the same company at the time of invention.

In order to avoid unwanted artifacts like dot crawl (caused by chrominance information being decoded as luminance) and false color (caused by luminance information being decoded as chrominance), the vertical processing block employed by the signal separation structures described above requires some type of adaptive behavior in response to the input signal characteristics. A number of proposals have been presented for changing the vertical processing block structure and/or operation in response to transition conditions. The simplest adaptive techniques switch between comb filtering and bandpass filtering based on the result of horizontal or line-to-line transition detection. Examples may be found in the previously mentioned UK Patent Application GB 2066615, as well as in U.S. Pat. No. 4,179,705 and U.S. Pat. No. 4,240,105, both titled "Method and apparatus for separation of chrominance and luminance with adaptive comb filtering in a quadrature modulated color television system." More complex adaptive techniques use different weighting coefficients to combine delayed and undelayed video signals, depending on the transition detection result. A small set of weighting coefficients may be used, as in the previously mentioned U.S. Pat. No. 6,459,457, or smoothly variable weighting coefficients may be used, as in U.S. Pat. No. 4,864,389, "Comb filter method and apparatus for chrominance and luminance separation in quadrature modulated color subcarrier television systems" and the previously mentioned U.S. Pat. No. 6,175,389.

All these techniques suffer from the fact that horizontal transitions are difficult to detect when there is significant overlap of luminance and chrominance signals. Tradeoffs can be made by adjusting the characteristics of the chrominance and/or luminance signals used for transition detection and/or comb filtering. For example, narrower bandwidth chrominance signals reduce the chance of false color, and wider bandwidth chrominance signals reduce the chance of dot crawl. Existing techniques generally select a tradeoff and vary the weighting of delayed and undelayed signals. Therefore, there exists a need in the art for an adaptive vertical processing technique that can dynamically adjust the characteristics of the luminance and/or chrominance signals, as well as the weighting of delayed and undelayed signals.

An opportunity arises to improve the accuracy of decoding of chrominance and luminance components from composite video signals without substantially increasing processing complexity. Reduced dot crawl and false color artifacts in decoded images may result.

SUMMARY OF THE INVENTION

The present invention relates to separation of composite video signals, such as NTSC or PAL signals. In particular, it relates to accurate decoding of chrominance and luminance components, which may reduce so-called dot crawl and false color artifacts of at least some images. Particular aspects of the present invention are described in the claims, specification and drawings.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

DETAILED DESCRIPTION

The following detailed description is made with reference to the figures. Preferred embodiments are described to illustrate the present invention, not to limit its scope, which is defined by the claims. Those of ordinary skill in the art will recognize a variety of equivalent variations on the description that follows.

Figure 5:
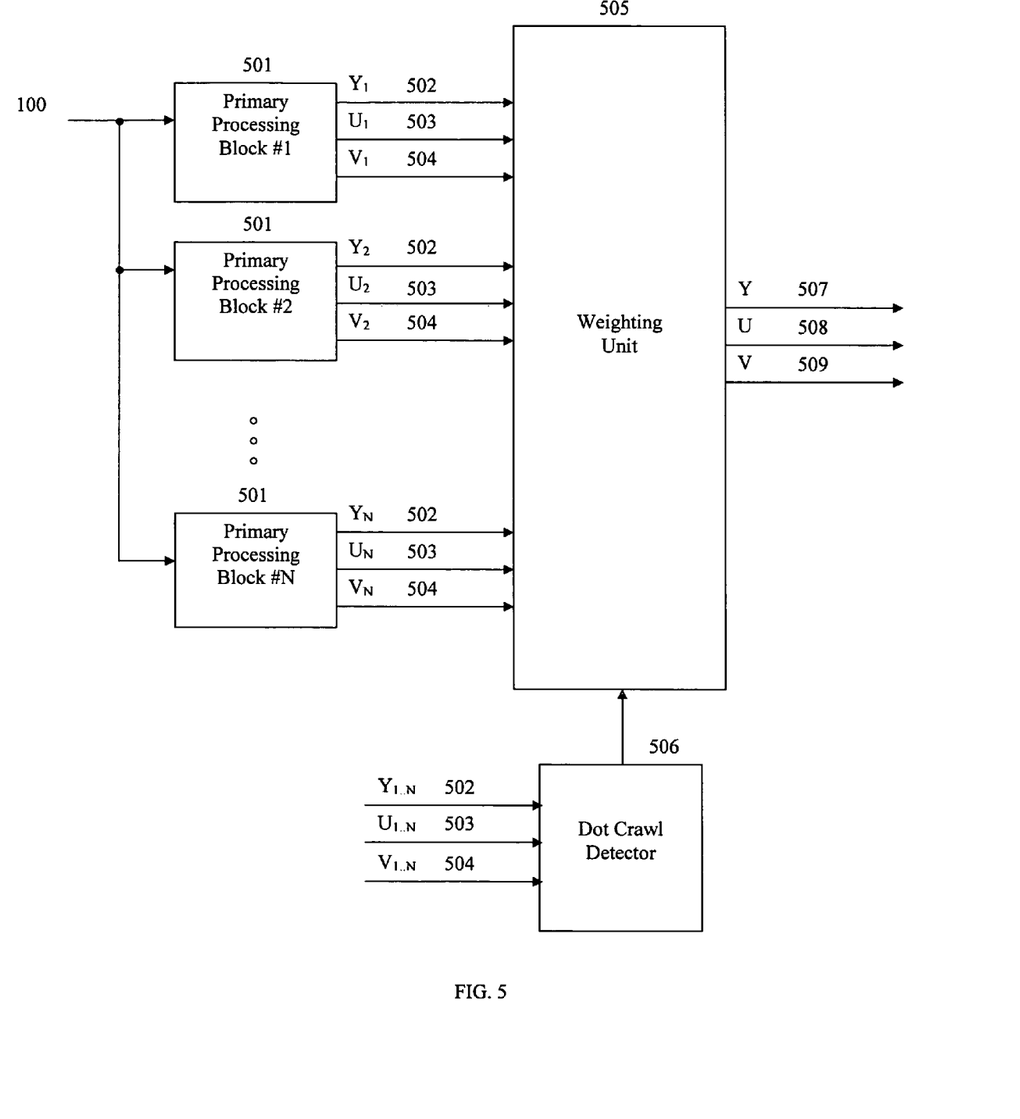
FIG. 5 is a block diagram of a signal separation device incorporating a dot crawl detector according to the invention.

FIG. 5 is a high level block diagram of a device that separates a composite video signal, which can be implemented as part of a single integrated circuit. The composite video signal 100 is processed by a plurality of primary processing blocks 501 that produce primary luminance signals 502 and chrominance signals 503, 504. (Note that although the labels U and V are used in the diagram to denote the color difference signals, the invention is not limited to any specific weighting of the color difference signals that may be implied by such labels.) The output signals 502, 503, and 504 from at least one of the primary processing blocks are provided to a dot crawl detector 506, which measures the level of chrominance signals that have been falsely decoded as luminance by the primary processing blocks. Based on this measurement, the dot crawl detector 506 provides a set of coefficients to the weighting unit 505. The weighting unit 505 combines the primary luminance 502 and chrominance signals 503, 504 from the primary processing blocks 501 according to the coefficients, and produces final luminance 507 and chrominance 508, 509 outputs.

Figure 11:
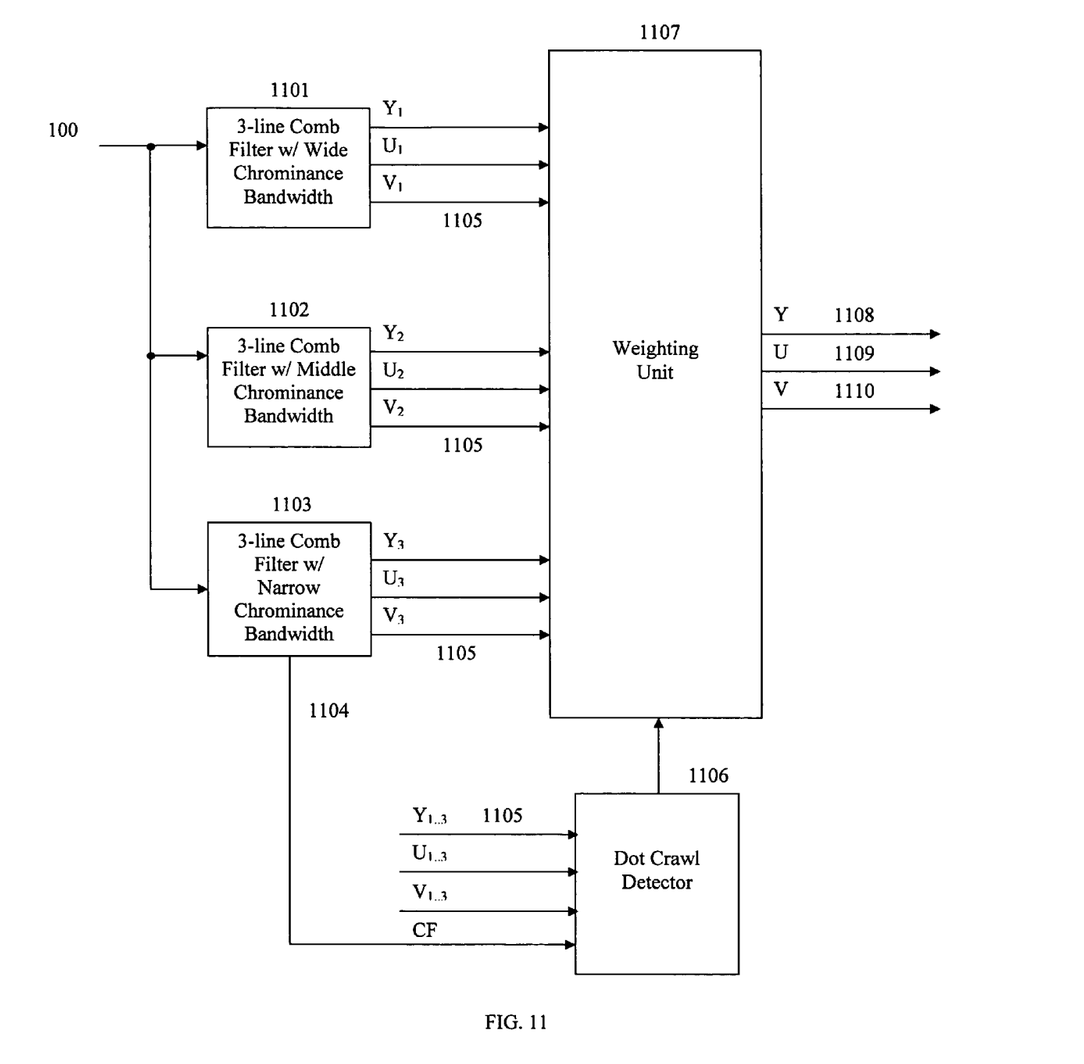
FIG. 11 is a block diagram of a preferred embodiment of the signal separation device incorporating a dot crawl detector according to the invention.

FIG. 11 is a high level block diagram of an embodiment using three primary processing blocks. The three primary processing blocks 1101, 1102, and 1103 may be implemented as three-line comb filters with color boundary detection. Generally speaking, there are three possible outputs from these three-line comb filters: 1) the average of the bottom two pixels or top two pixels if a color boundary is detected between line 1 and line 2, or between line 2 and line 3, respectively; 2) the average of all three pixels no color boundary is detected; or 3) the middle pixel if color boundaries are detected both between line 1 and line 2 and between line 2 and line 3. A three-line comb filter may apply averaging or gentle switching among possible outputs. The figure indicates that the three primary processing blocks of this embodiment differ in the bandwidth of the chrominance signals, providing wide 1101, middle 1102, and narrow 1103 bandwidth chrominance outputs, depending on the separation filter used to filter the chrominance signal from the composite video signal. Since the chrominance bandwidth also affects the color boundary detection, the three primary processing blocks also have different luminance outputs. The luminance and chrominance outputs 1105 of one or more of three primary processing blocks (all three in the figure) are output to the dot crawl detector 1106 and the weighting unit 1107. A comb fail flag (CF) (sometimes called a line-to-line transition flag) 1104 is output to the dot crawl detector from the three line comb filter with narrow chrominance bandwidth 1103 to indicate that the comb filter chose the middle pixel rather than a 2-line or 3-line average. The comb fail flag 1104 is used by the dot crawl detector 1106 illustrated in FIG. 12 and described below. The dot crawl detector 1106 measures the level of chrominance signals that have been falsely decoded as luminance by the primary processing blocks. Based on this measurement, the dot crawl detector 1106 provides a set of coefficients to the weighting unit 1107. The weighting unit 1107 combines the luminance and chrominance signals 1105 from the primary processing blocks according to said coefficients, and produces final luminance 1108 and chrominance 1109, 1110 outputs.

Figure 6:
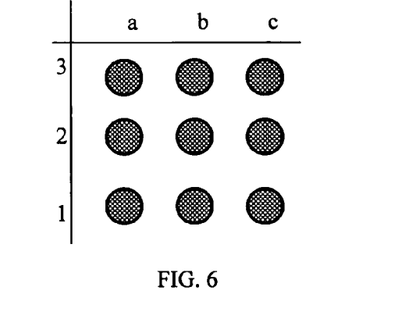
FIG. 6 illustrates the pixel window used by a preferred embodiment of the dot crawl detector.

The dot crawl detector uses at least a 3×3 pixel window, for instance from the primary processing block with the middle bandwidth output 1102. A 3×3 pixel window is illustrated in FIG. 6. Lines 1, 2, and 3 represent three lines of the video signal, and columns a, b, and c represent adjacent pixels. The delayed outputs could be obtained by adding a delay element between the primary processing blocks and the dot crawl detector, or could be generated simultaneously by the primary processing blocks, for example as described in U.S. patent application Ser. No. 10/725,955.

Figure 7A:
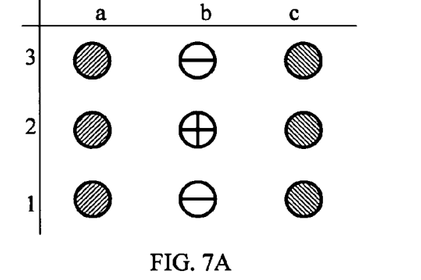
FIGS. 7A and 7B illustrate the dot crawl phenomenon.
Figure 7B:
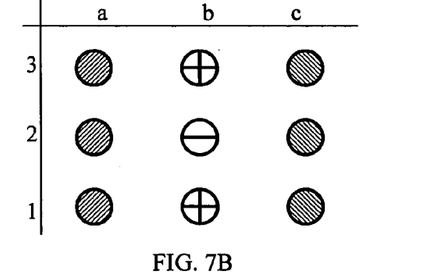

FIGS. 7A and 7B illustrate the dot crawl phenomenon. When an image to be decoded has an abrupt vertical change in color, the modulated chrominance signal will have high bandwidth. Depending on the signal bandwidth used in the 3-line comb filters, some of the chrominance signal may be decoded as luminance. Due to the phase inversion property of the chrominance subcarrier from line to line and frame to frame (or every other line or frame for PAL), the mistakenly decoded luminance will change from lighter to darker. This produces a fine pattern of dots that apparently travel (or "crawl") upward along the transition at a rate of one image row per field time. A sample of this artifact was viewable on 17 May 2005 and can be seen at http://www.michaeldvd.com.au/Articles/VideoArtefacts/VideoArtefactsDot-Crawl.html. A sketch of the dot crawl artifact also appears on p. 354 of the previously referenced book by Charles Poyton. When dot crawl appears, the luminance outputs have the relationship illustrated in FIG. 7A or 7B, each representing a 3×3 pixel window of the middle bandwidth luminance output. In FIG. 7A, the luminance outputs 1*b* and 3*b* are darker than 2*b*. In FIG. 7B, the luminance outputs 1*b* and 3*b* are lighter than 2*b*. Since dot crawl happens when there is an abrupt vertical color transition leading to chrominance information being decoded as luminance, chrominance values in column a should be different from chrominance values in column c.

Figure 8:
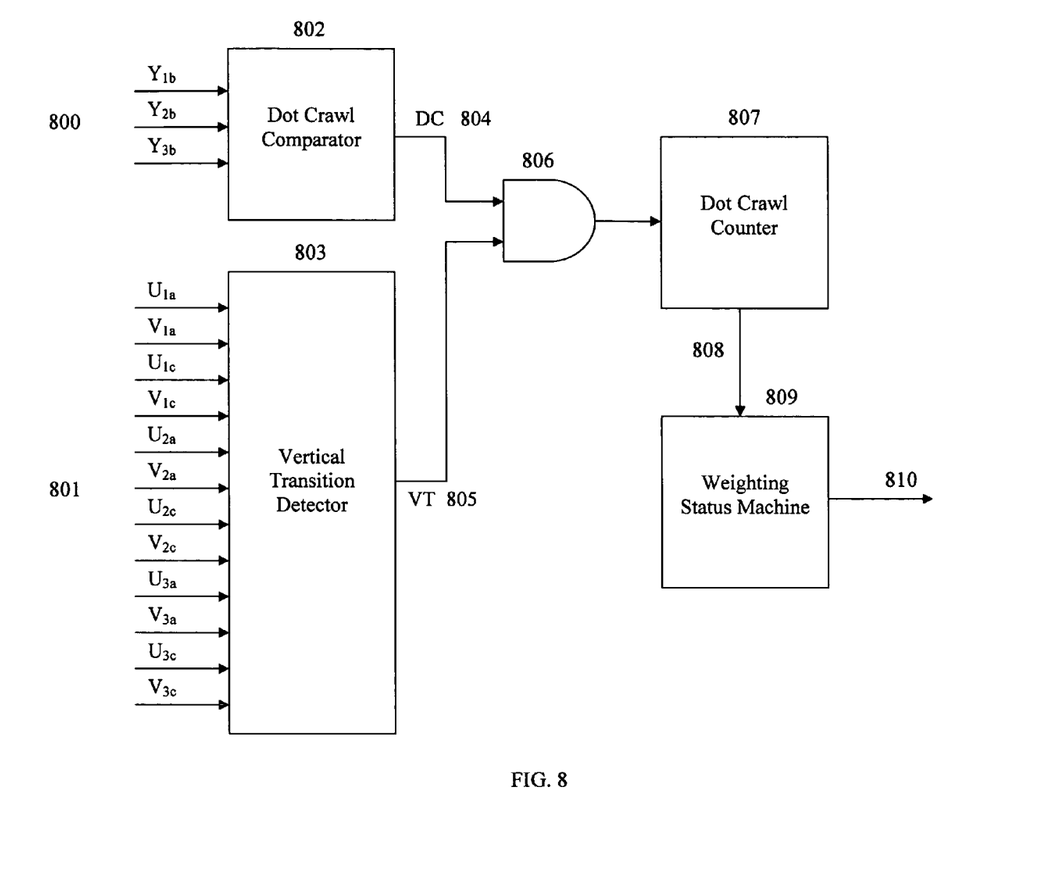
FIG. 8 is a block diagram of one embodiment of the dot crawl detector.

FIG. 8 illustrates one embodiment of a dot crawl detector that measures error in decoding chrominance and luminance. One or more luminance inputs 800 from column b of the 3×3 pixel window are input to a dot crawl comparator 802. Chrominance inputs 801 from columns a and c of the 3×3 pixel window are input to a vertical transition detector 803. The dot crawl comparator 802 performs the following computations:

$$Y21 = Y2b - Y1b \quad \text{(Eq. 1)}$$

$$Y23 = Y2b - Y3b \quad \text{(Eq. 2)}$$

$$Y13 = \text{abs}(Y1b - Y3b) \quad \text{(Eq. 3)}$$

$$A = ((Y21 > THR1) \text{ AND } (Y23 > THR1)) \quad \text{(Eq. 4)}$$

$$B = ((Y21 \leq THR1) \text{ AND } (Y23 \leq THR1)) \quad \text{(Eq. 5)}$$

$$C = (Y13 < THR2) \quad \text{(Eq. 6)}$$

$$DC = (A \text{ OR } B) \text{ AND } C \quad \text{(Eq. 7)}$$

THR1 and THR2 are programmable thresholds, and DC is the final output of the dot crawl comparator. Sample values that can be used in this embodiment are THR1=2 IRE and THR2=1 IRE. (IRE stands for "Institute of Radio Engineers" and refers to units of video signal amplitude commonly used in the art.)

The vertical transition detector 803 performs the following computations:

$$\text{diff1} = \text{cdiff}(P1a, P1c) \quad \text{(Eq. 8)}$$

$$\text{diff2} = \text{cdiff}(P2a, P2c) \quad \text{(Eq. 9)}$$

$$\text{diff3} = \text{cdiff}(P3a, P3c) \quad \text{(Eq. 10)}$$

$$\text{diffmin} = \min(\text{diff1}, \text{diff2}, \text{diff3}) \quad \text{(Eq. 11)}$$

$$VT = (\text{diffmin} > THR3) \quad \text{(Eq. 12)}$$

THR3 is a programmable threshold, and VT is the final output of the vertical transition detector. A sample value for THR3 that can be used in this embodiment is THR3=2 IRE. The function cdiff(P1,P2) is a measure of the difference between the color signals of pixels P1 and P2. In one embodiment, cdiff( ) is approximated by the following formula:

$$\text{cdiff}(P1,P2) = \max(\max(\text{abs}(U_{P1}-U_{P2}), \text{abs}(V_{P1}-V_{P2})),$$
$$\max((\tfrac{7}{8} * \text{abs}(U_{P1}-U_{P2}) + \tfrac{1}{2} * \text{abs}(V_{P1}-V_{P2})),$$
$$\tfrac{1}{2} * \text{abs}(U_{P1}-U_{P2}) + \tfrac{7}{8} * \text{abs}(V_{P1}-V_{P2}))) \quad \text{(Eq. 13)}$$

Signals DC 804 and VT 805 are combined by AND gate 806 for input to a dot crawl counter 807, which counts the number of pixels with dot crawl detected, and produces a dot crawl count 808. In a preferred embodiment, the dot crawl count 808 is reset to 0 at the beginning of each video field. (A video field represents one scan of the video image. Both NTSC and PAL signals generally use an interlaced format, where only half the lines are scanned for each field. Two fields comprise a complete frame of video.) The dot crawl count 808 is provided to a weighting status machine 809, which operates according to the state diagram in FIG. 9, and produces the output coefficients 810.

Figure 9:
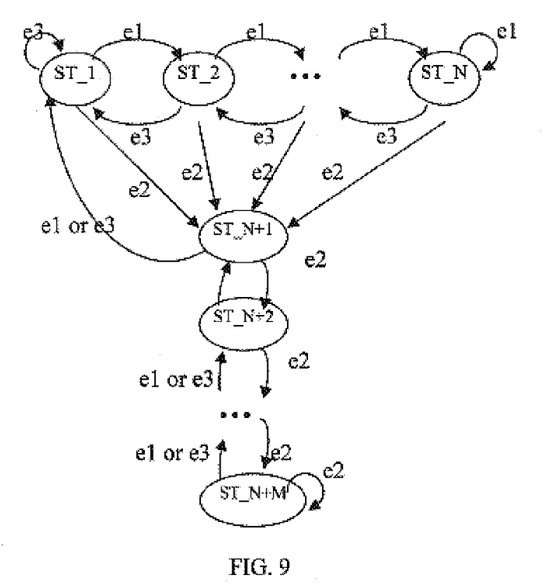
FIG. 9 is a state diagram for a weighting status machine used by the dot crawl detector.

Referring to FIG. 9, ST_1, ST_N, and ST_N+M are the states where middle bandwidth, wide bandwidth, and narrow bandwidth outputs respectively are selected. For example, in ST_1, the coefficients for middle bandwidth outputs are 1 and the coefficients for wide and narrow bandwidth outputs are 0. The other intermediate states are entered when switching either from ST_1 to ST_N or from ST_N+1 to ST_N+M, and at these states, the output coefficients operate to provide proportional switching between outputs of differing bandwidth. For example, in ST_2, the coefficients for the middle bandwidth outputs are approximately 1/(N−1) and the coefficients for the wide bandwidth outputs are approximately (N−2)/(N−1). There are N states during switching from middle bandwidth to wide bandwidth, and M states from middle bandwidth to narrow bandwidth. The state machine is driven by the value of the dot crawl count 808 at the end of each video field. Three values are computed:

$$e1 = \text{dot crawl count } 808 > THR4 \quad \text{Eq. 14}$$

$$e2 = (\text{dot crawl count } 808 < THR4) \text{ AND } (\text{dot crawl count } 808 > THR5) \quad \text{Eq. 15}$$

$$e3 = \text{dot crawl count } 808 < THR5 \quad \text{Eq. 16}$$

THR4 and THR5 are programmable thresholds, and e1, e2, and e3 drive the state machine as illustrated in FIG. 9. Sample values for THR4 and THR5 that can be used in this embodiment are as follows:

THR4=3840 (525-line signals) or 4550 (625-line signals)

THR5=2048 (525-line signals) or 2430 (625-line signals)

(Normally, NTSC signals are 525-line and PAL signals are 625-line, referring to the number of total lines in a video frame. But there are exceptions such as PAL-M, which is a 525-line version of PAL used in Brazil.)

In general, the weighting status machine 809 provides proportional or gentle switching between the three different bandwidth signals, and it prevents abrupt switching which can cause noticeable flickering in the video output.

Figure 10A:
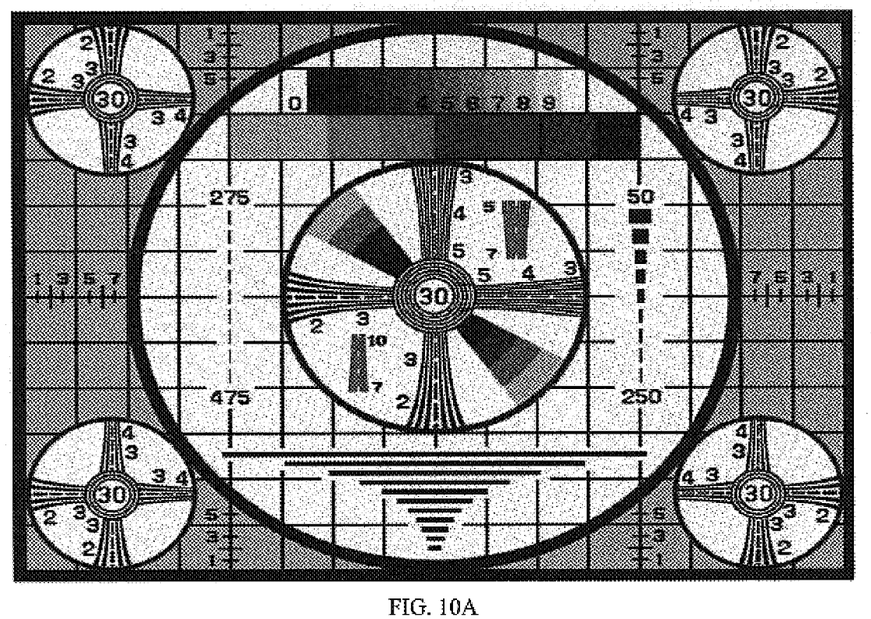
FIGS. 10A, 10B, and 10C illustrate the performance of different comb filter configurations for the monoscope test pattern.
Figure 10B:
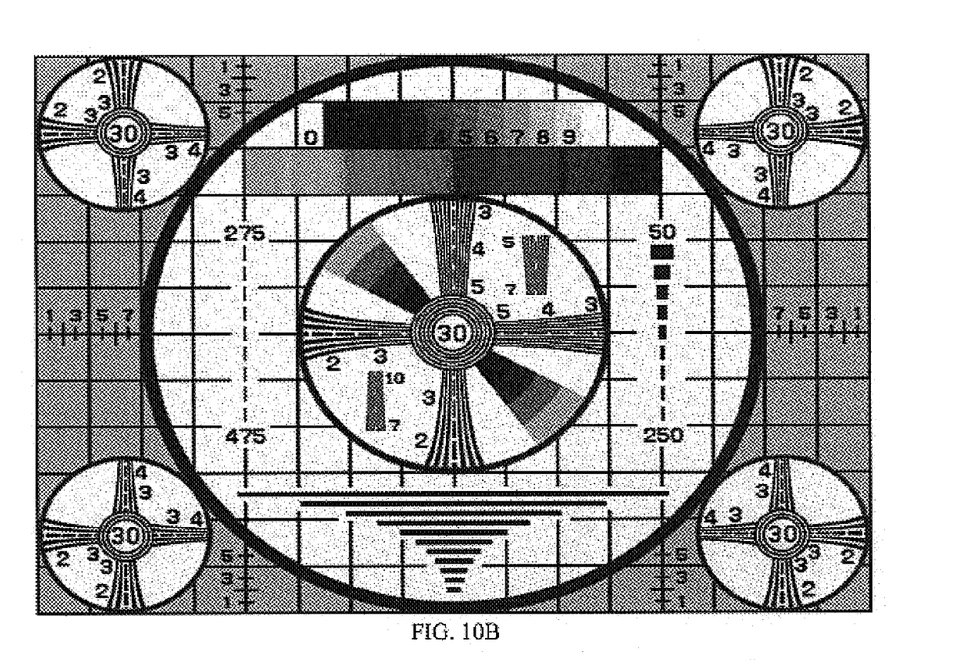
Figure 10C:
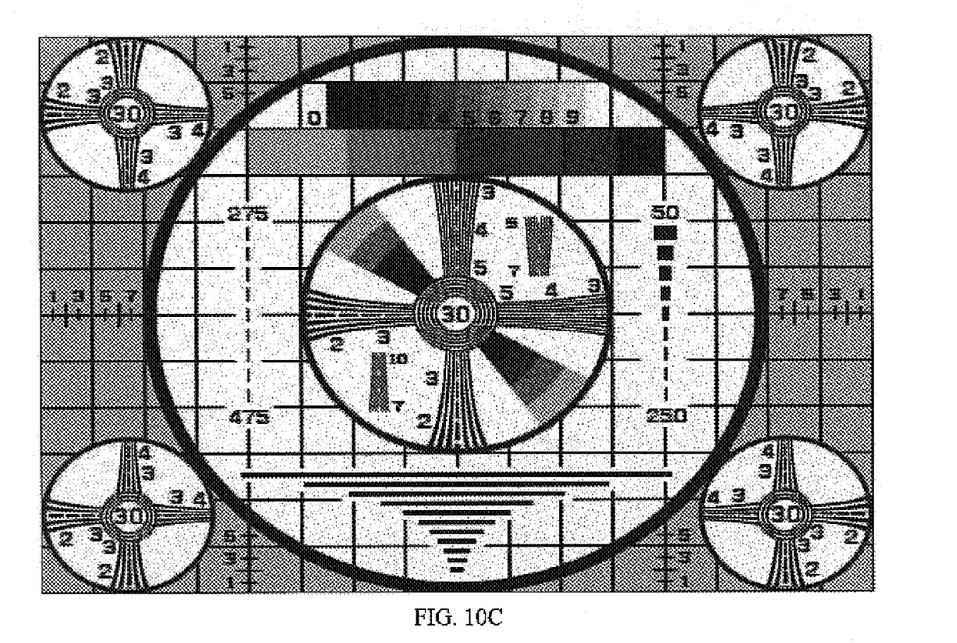
Figure 12:
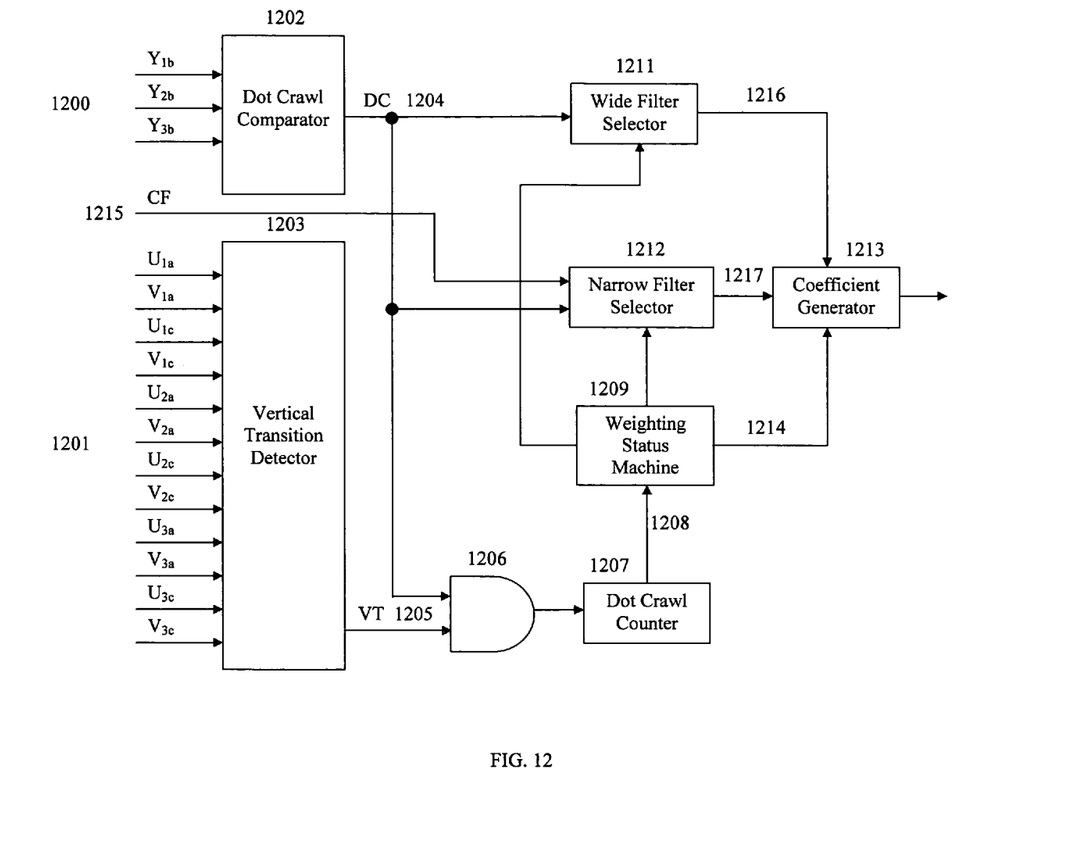
FIG. 12 is a block diagram of a preferred embodiment of the dot crawl detector.

Since the weighting status machine 809 only updates the coefficients once every video field, it leaves artifacts in images that require different chrominance bandwidths in different areas of the same field. The "monoscope" pattern shown in FIG. 10A, originally submitted in color, is an example. The small colorbar area requires wide chrominance bandwidth to reduce dot crawl, while the rest of the picture requires narrow chrominance bandwidth to reduce false color. FIG. 10B shows the decoded monoscope pattern if only the narrow bandwidth signals are used, and FIG. 10C shows the decoded monoscope pattern if only the wide bandwidth signals are used. To handle this kind of image, an embodiment of the dot crawl detector is enhanced as shown in FIG. 12. Luminance inputs 1200 from column b of the 3×3 pixel window are input to a dot crawl comparator 1202. Chrominance inputs 1201 from columns a and c of the 3×3 pixel window are input to a vertical transition detector 1203. The dot crawl comparator 1202 is identical to dot crawl comparator 802 described above, and the vertical transition detector 1203 is identical to the vertical transition detector 803 described above. Signals DC 1204 and VT 1205 are combined by AND gate 1206 for input to a dot crawl counter 1207, which counts the number of pixels with dot crawl detected, and produces a dot crawl count 1208. In one embodiment, the dot crawl count 1208 is reset to 0 at the beginning of each video field.

A state machine, referred to as the weighting status machine, provides gentle switching between coefficient sets for the overall frame. The dot crawl count 1208 is provided to the weighting status machine 1209, which operates according to the state diagram in FIG. 9, and produces intermediate output coefficients 1214. As illustrated in FIG. 9, a preferred embodiment of the weighting status machine has transitions that allow the bandwidth selection to quickly transition from wide (ST_N) to narrow (ST_N+M), bypassing states ST_1 through ST_N−1 where a combination of middle and wide bandwidths is used. However, when transitioning from narrow (ST_N+M) to wide (ST_N) bandwidth, there is no quick transition. This configuration was determined experimentally to have a reasonable tradeoff between transition time and unwanted artifacts caused by bandwidth transitions. In other embodiments, the weighting status machine may be modified from FIG. 9 to remove the quick transition from wide to narrow, or add a quick transition from narrow to wide, without departing from the scope of the invention. Such modifications reduce bandwidth transition artifacts in certain types of video.

The dot crawl detector of FIG. 12 also includes a wide filter selector 1211 and a narrow filter selector 1212. The wide filter selector 1211 outputs a wide filter flag 1216 if dot crawl is detected by the dot crawl comparator 1202 and if the weighting status machine 1209 has selected the narrow filter. The narrow filter selector 1212 outputs a narrow filter flag 1217 if no dot crawl is detected by the dot crawl comparator 1202, the comb fail flag 1215 is set, and the weighting status machine 1209 has selected the wide filter. Recall that the comb fail or line-to-line transition flag 1215 is generated by a three-line comb filter, for instance one with narrow chrominance bandwidth 1103, as illustrated in FIG. 11 and described above. A coefficient generator 1213 sets the final output coefficients 1210 based on the wide filter flag 1216, the narrow filter flag 1217, and the intermediate coefficient outputs 1214 from the weighting status machine 1209. If the dot crawl detector of FIG. 12 is used, the monoscope pattern can be decoded as in FIG. 10A with minimal dot crawl and false color artifacts.

SOME PARTICULAR EMBODIMENTS

The present invention may be practiced as a method or device. The invention may be an article of manufacture such as media impressed with logic to carry out computer-assisted separation of composite video signals.

Various device embodiments useful to separate composite video signals include primary processing blocks that receive and process a composite video signal to produce differentiated sets of primary luminance and chrominance outputs, a dot crawl detector which measures dot crawl presence in at least one of the primary luminance outputs and generates a set of weighting coefficients based on the measured dot crawl presence, and a weighting unit which combines the primary luminance and chrominance outputs according to the set of weighting coefficients to produce final luminance and chrominance outputs. The dot crawl detector is coupled in communication with at least one of the primary processing blocks, and the weighting unit is coupled in communication with the primary processing blocks and the dot crawl detector.

Numerous embodiments exist for the primary processing blocks. In some embodiments the primary processing blocks include adaptive comb filters with line-to-line transition detection. In some embodiments, the primary processing blocks process the signal with line-to-line transition detection and comb filtering; and the primary luminance and chrominance outputs from the primary processing blocks have observable differences in dot crawl and false color artifacts for at least some input signals. In some embodiments, the primary processing blocks apply chrominance separation filters having different bandwidths to filter chrominance information from the signal. The primary processing blocks can also apply adaptive comb filters with line-to-line transition detection.

Numerous embodiments exist for the adaptive comb filter. In some embodiments, the adaptive comb filter operates on at least three lines of video, and includes logic to 1) exclude at least one line and average remaining lines if a line-to-line transition is detected, 2) average the lines without exclusion if no line-to-line transition is detected, or 3) use a middle of the lines if multiple line-to-line transitions are detected. In some embodiments, one or more of the comb filters set a line-to-line transition flag to indicate when multiple transitions were detected.

In some embodiments, the dot crawl detector includes a dot crawl comparator, a color transition detector, a dot crawl counter, and a weighing status machine. The dot crawl comparator operates on at least a 3×1 pixel column of luminance samples, and sets a dot crawl detected flag based on analysis of the luminance samples. The color transition detector operates on at least a 1×3 pixel row of chrominance samples and sets a color edge detected flag based on analysis of the chrominance samples. The dot crawl counter increments when the dot crawl detected and color edge detected flags are both set. The weighting status machine transitions to a current state based at least in part on the dot crawl counter and generates the set of weighting coefficients based on the current state.

In some embodiments, the dot crawl comparator performs distance measurements between the luminance samples, and sets a dot crawl detected flag based on comparison of the measurements to one or more thresholds.

In some embodiments, the color transition detector performs distance measurements between the chrominance samples, and sets the color edge detected flag based on comparison of the measurements to one or more thresholds.

In some embodiments, the dot crawl detector includes a narrow filter selector and/or a wide filter selector. The narrow filter selector outputs a narrow filter flag when the dot crawl detected output flag is not set, the color edge detected flag is not set, and the state of the weighting status machine does not select the primary processing block with the narrowest bandwidth chrominance extraction filter. The wide filter selector outputs a wide filter flag when the dot crawl detected output flag is set, and the state of the weighting status machine does not select the primary processing block with the widest bandwidth chrominance extraction filter.

Various method embodiments of separating composite video signals include processing a composite video signal. For example, the processing uses primary processing procedures each operating on the same composite video signal, and each primary processing procedure generates a set of primary luminance and chrominance outputs. In another example, the processing produces differentiated sets of primary luminance and chrominance outputs. Such method embodiments also include: detecting dot crawl in one or more of the primary luminance outputs, generating a set of weighting coefficients based on the level of dot crawl detected, and applying the weighting coefficients to the primary luminance and chrominance outputs to produce final luminance and chrominance outputs.

In some embodiments, the processing of the composite video signal further includes applying adaptive comb filters with line-to-line transition detection, and/or applying chrominance separation filters having different bandwidths to filter chrominance information from the signal.

In some embodiments, chrominance outputs from the primary processing blocks have observable differences in dot crawl and false color artifacts for at least some input signals.

In some embodiments, detecting of dot crawl further includes analyzing at least a 3×1 pixel column of luminance samples and setting a dot crawl detected flag based on analysis of said luminance samples, analyzing at least a 1×3 pixel row of chrominance samples and setting a color edge detected flag based on analysis of said chrominance samples, and incrementing a dot crawl counter when the dot crawl detected and color edge detected flags are both set.

Some embodiments include transitioning in a weighting status machine to a current state based at least in part on the dot crawl counter and generating the set of weighting coefficients based on the current state.

Some embodiments favor luminance by triggering a narrow filter selector, and/or favor chrominance by triggering a wide filter selector.

Some embodiments trigger a narrow filter selector when the dot crawl detected output flag is not set, the color edge detected flag is not set, and the state of the weighting status machine does not select the primary processing block with the narrowest bandwidth chrominance extraction filter.

Some embodiments trigger a wide filter selector when the dot crawl detected output flag is set and the state of the weighting status machine does not select the primary processing block with the widest bandwidth chrominance extraction filter.

While the present invention is disclosed by reference to the preferred embodiments and examples detailed above, it is understood that these examples are intended in an illustrative rather than in a limiting sense. It is contemplated that modifications and combinations will readily occur to those skilled in the art, which modifications and combinations will be within the spirit of the invention and the scope of the following claims.

We claim as follows:

1. A device useful to separate composite video signals, including:
   a plurality of primary processing blocks that receive and process a composite video signal to produce differentiated sets of primary luminance and chrominance outputs;
   a dot crawl detector, coupled in communication with at least one of the primary processing blocks, which measures dot crawl presence in at least one of the primary luminance outputs and generates a set of weighting coefficients based on the measured dot crawl presence; and
   a weighting unit, coupled in communication with the primary processing blocks and the dot crawl detector, which combines the primary luminance and chrominance outputs according to the set of weighting coefficients to produce final luminance and chrominance outputs.

2. The device of claim 1, wherein the primary processing blocks include adaptive comb filters with line-to-line transition detection.

3. The device of claim 1, wherein:
   the primary processing blocks process the signal with line-to-line transition detection and comb filtering; and
   the primary luminance and chrominance outputs from the primary processing blocks have observable differences in dot crawl and false color artifacts for at least some input signals.

4. The device of claim 1, wherein the primary processing blocks apply chrominance separation filters having different bandwidths to filter chrominance information from the signal.

5. The device of claim 1, wherein the primary processing blocks apply chrominance separation filters having different bandwidths to filter chrominance information from the signal and apply adaptive comb filters with line-to-line transition detection.

6. The device of claim 2 or 3 or 5,
   wherein the adaptive comb filter operates on at least three lines of video and includes logic to
      exclude at least one line and average remaining lines if a line-to-line transition is detected,
      average the lines without exclusion if no line-to-line transition is detected, or
      use a middle of the lines if multiple line-to-line transitions are detected.

7. The device of claim 6, wherein one or more of the comb filters set a line-to-line transition flag to indicate when multiple transitions were detected.

8. The device of claim 1, wherein the dot crawl detector includes:
   a dot crawl comparator that
      operates on at least a 3×1 pixel column of luminance samples, and
      sets a dot crawl detected flag based on analysis of said luminance samples;
   a color transition detector that
      operates on at least a 1×3 pixel row of chrominance samples and
      sets a color edge detected flag based on analysis of said chrominance samples;
   a dot crawl counter that increments when the dot crawl detected and color edge detected flags are both set, and
   a weighting status machine that
      transitions to a current state based at least in part on the dot crawl counter and
      generates the set of weighting coefficients based on the current state.

9. The device of claim 8, wherein the dot crawl comparator further:
   performs distance measurements between said luminance samples; and
   sets a dot crawl detected flag based on comparison of said measurements to one or more first thresholds.

10. The device of claim 8, wherein the color transition detector further:
    performs distance measurements between said chrominance samples, and
    sets the color edge detected flag based on comparison of said measurements to one or more second thresholds.

11. The device of claim 4, wherein the dot crawl detector includes:
    a dot crawl comparator that
       operates on at least a 3×1 pixel column of luminance samples, and
       sets a dot crawl detected flag based on analysis of said luminance samples;
    a color transition detector that
       operates on at least a 1×3 pixel row of chrominance samples and sets a color edge detected flag based on analysis of said chrominance samples;

a dot crawl counter that increments when the dot crawl detected and color edge detected flags are both set, a weighting status machine that
transitions to a current state based at least in part on the dot crawl counter and
generates the set of weighting coefficients based on the current state, and a narrow filter selector that outputs a narrow filter flag when
the dot crawl detected output flag is not set,
the color edge detected flag is not set, and
the state of the weighting status machine does not select the primary processing block with the narrowest bandwidth chrominance extraction filter.

12. The device of claim 4, wherein the dot crawl detector includes:
a dot crawl comparator that
operates on at least a 3×1 pixel column of luminance samples, and
sets a dot crawl detected flag based on analysis of said luminance samples;
a color transition detector that
operates on at least a 1×3 pixel row of chrominance samples and
sets a color edge detected flag based on analysis of said chrominance samples;
a dot crawl counter that increments when the dot crawl detected and color edge detected flags are both set,
a weighting status machine that
transitions to a current state based at least in part on the dot crawl counter and
generates the set of weighting coefficients based on the current state, and
a wide filter selector that outputs a wide filter flag when
the dot crawl detected output flag is set, and
the state of the weighting status machine does not select the primary processing block with the widest bandwidth chrominance extraction filter.

13. The device of claim 12, wherein the dot crawl detector further includes a narrow filter selector that outputs a narrow filter flag when:
the dot crawl detected output flag is not set,
the color edge detected flag is not set, and
the state of the weighting status machine does not select the primary processing block with the narrowest bandwidth chrominance extraction filter.

14. A method of separating composite video signals, including processing a composite video signal using a plurality of primary processing procedures, wherein each primary processing procedure operates on the same composite video signal, and each primary processing procedure generates a set of primary luminance and chrominance outputs;
detecting dot crawl in one or more of said primary luminance outputs;
generating a set of weighting coefficients based on the level of dot crawl detected;
applying said weighting coefficients to said primary luminance and chrominance outputs to produce final luminance and chrominance outputs.

15. A method of separating composite video signals, including:
processing a composite video signal to produce a plurality of differentiated sets of primary luminance and chrominance outputs;
detecting dot crawl in one or more of the primary luminance outputs;
generating a set of weighting coefficients based on the detected dot crawl; and
applying said weighting coefficients to the plurality of primary luminance and chrominance outputs to produce final luminance and chrominance outputs.

16. The method of claim 15, wherein the processing of the composite video signal further includes applying adaptive comb filters with line-to-line transition detection.

17. The method of claim 15, wherein chrominance outputs from the primary processing blocks have observable differences in dot crawl and false color artifacts for at least some input signals.

18. The method of claim 15, wherein the processing of the composite video signal further includes applying chrominance separation filters having different bandwidths to filter chrominance information from the signal.

19. The method of claim 18, wherein chrominance outputs from the primary processing blocks have observable differences in dot crawl and false color artifacts for at least some input signals.

20. The method of claim 15, wherein the detecting of dot crawl in one or more of the primary luminance outputs further includes
analyzing at least a 3×1 pixel column of luminance samples and setting a dot crawl detected flag based on analysis of said luminance samples;
analyzing at least a 1×3 pixel row of chrominance samples and setting a color edge detected flag based on analysis of said chrominance samples; and
incrementing a dot crawl counter when the dot crawl detected and color edge detected flags are both set.

21. The method of claim 20, further including transitioning in a weighting status machine to a current state based at least in part on the dot crawl counter and generating the set of weighting coefficients based on the current state.

22. The method of claim 21, further including triggering a narrow filter selector when
the dot crawl detected output flag is not set,
the color edge detected flag is not set, and
the state of the weighting status machine does not select the primary processing block with the narrowest bandwidth chrominance extraction filter.

23. The method of claim 21, further including triggering a wide filter selector when
the dot crawl detected output flag is set and
the state of the weighting status machine does not select the primary processing block with the widest bandwidth chrominance extraction filter.

* * * * *